(12) United States Patent
Franklin

(10) Patent No.: US 6,267,901 B1
(45) Date of Patent: Jul. 31, 2001

(54) METHODS AND APPARATUS FOR WASTEWATER TREATMENT ON OFFSHORE STRUCTURES

(75) Inventor: Albert G. Franklin, Conroe, TX (US)

(73) Assignee: Albert Franklin, Conroe, TX (US)

( * ) Notice: Subject to any disclaimer, the term of this patent is extended or adjusted under 35 U.S.C. 154(b) by 0 days.

(21) Appl. No.: 09/495,004

(22) Filed: Jan. 31, 2000

(51) Int. Cl.⁷ .................................................. B01D 21/24
(52) U.S. Cl. .................... 210/800; 210/104; 210/109; 210/513
(58) Field of Search ..................................... 210/170, 747, 210/104, 109, 513, 521, 767, 800, 776; 166/357, 267

(56) References Cited

U.S. PATENT DOCUMENTS

| | | |
|---|---|---|
| 2,767,802 * | 10/1956 | Orrell . |
| 3,752,318 * | 8/1973 | DeRouen et al. .................... 210/251 |
| 3,756,409 | 9/1973 | Carmichael et al. ................ 210/104 |
| 3,893,918 | 7/1975 | Favret ..................................... 210/84 |
| 4,252,649 * | 2/1981 | Favret, Jr. ............................ 210/170 |
| 4,330,402 * | 5/1982 | LeBoeuf .............................. 210/170 |
| 4,431,534 * | 2/1984 | Gordon ................................ 210/110 |
| 4,737,282 * | 4/1988 | Senyard, Sr. et al. ............... 210/188 |
| 4,816,146 * | 3/1989 | Schertler ............................. 210/170 |
| 5,702,206 | 12/1997 | Quenan et al. ...................... 405/227 |
| 5,840,198 * | 11/1998 | Clarke ................................. 210/802 |

* cited by examiner

Primary Examiner—David A. Simmons
Assistant Examiner—Frank M. Lawrence
(74) Attorney, Agent, or Firm—Madan, Mossman & Sriram, P.C.

(57) ABSTRACT

Apparatus and methods for treatment of oil-containing water before discharge into a surrounding body of water from an offshore structure includes the use of an oil sump, an inlet pipe, an oil collection tube and an oil discharge tube, all carried by and within a caisson, with the oil sump having a side wall extending above the vapor/oil interface formed within the caisson.

37 Claims, 7 Drawing Sheets

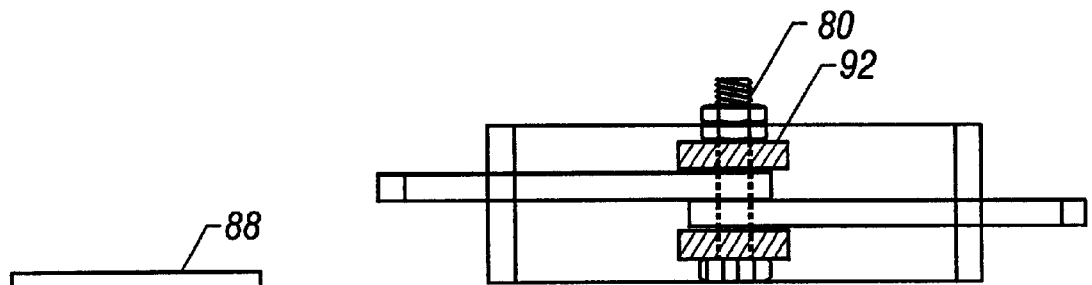
FIG. 6B-4
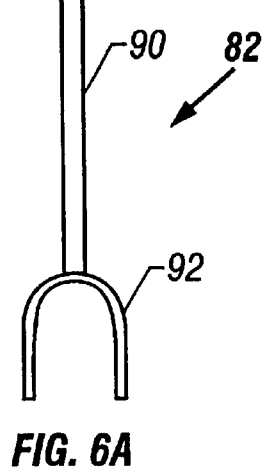
FIG. 6A
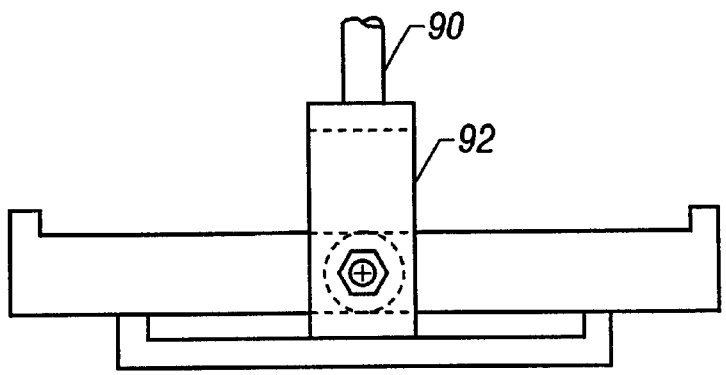
FIG. 6B-3
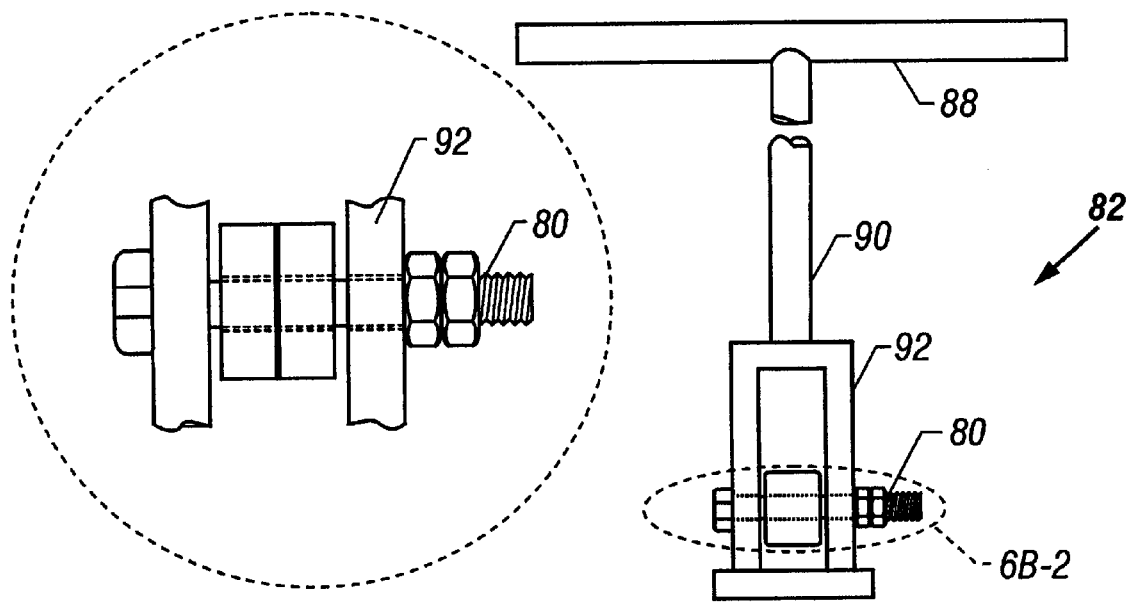
FIG. 6B-2
FIG. 6B-1

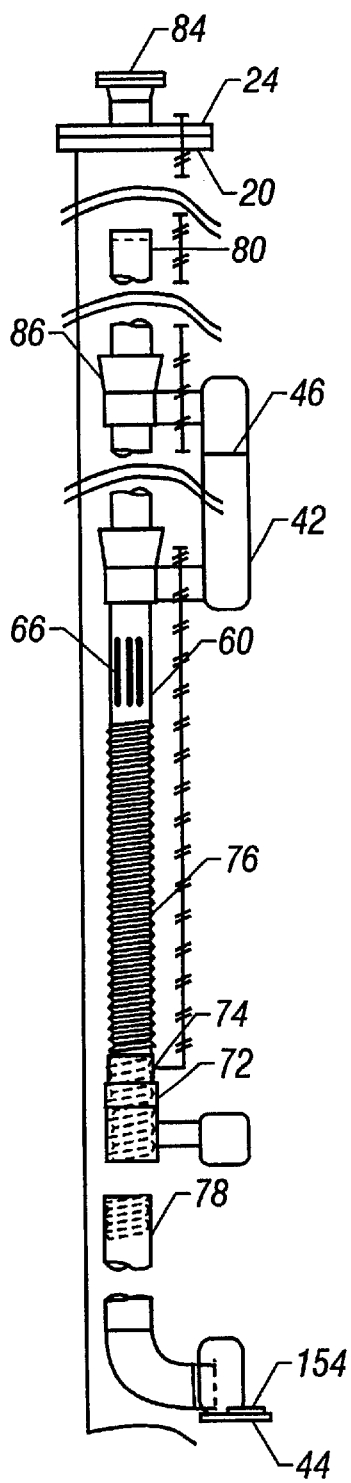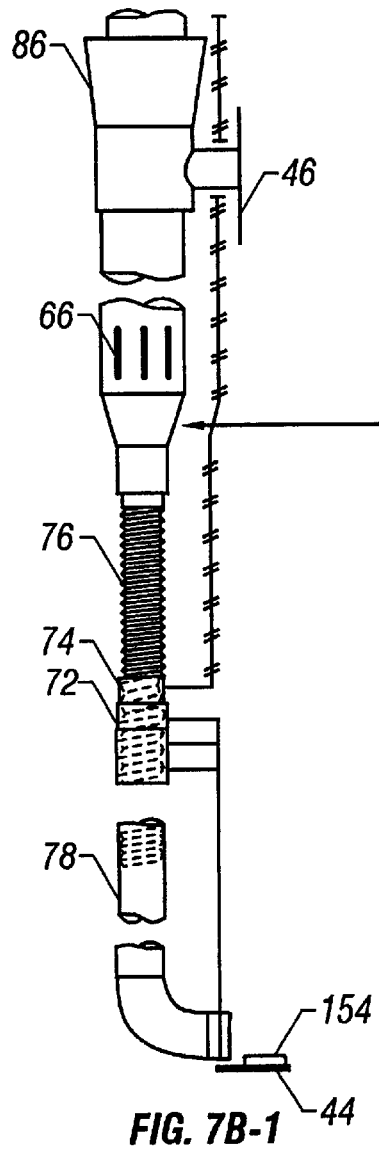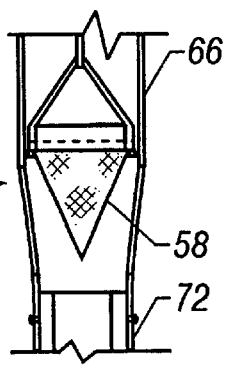
FIG. 7A
FIG. 7B-1
FIG. 7B-2

METHODS AND APPARATUS FOR WASTEWATER TREATMENT ON OFFSHORE STRUCTURES

FIELD OF THE INVENTION

The present invention relates generally to methods and apparatus for wastewater treatment on offshore structures. More particularly, a method and apparatus for removing oil and grease from deck drain storm water and wash down water before its discharge from an offshore structure into the surrounding body of water are provided.

BACKGROUND OF THE INVENTION

Many offshore structures such as drilling rigs and production platforms for oil and gas segregate run off water from rainstorms and wash down water used to clean equipment and deck surfaces from produced or process water. The rainwater and wash down water may pick up oil and or grease that would be harmful to aquatic life if discharged into the surrounding body of water without treatment. Before discharging into a surrounding body of water, it is segregated and treated separately from produced or process water to avoid overloading treatment systems or causing unwanted solids formation. Government agencies regulating this discharge occasionally promulgate more stringent oil and grease discharge requirements for the discharge of these wastewater streams, which require more reliable treatment and better treatment methods.

Many disadvantages are associated with current wastewater sump tanks, disposal caissons or piles and their methods of use. One disadvantage is ineffective separation of the oil and grease droplets of the particle size typically found in rainwater runoff and/or wash down water. Ineffective separation may also be caused by improper design criteria such as inadequate residence times, rainwater runoff projections or by the physical design of the tank, caisson or pile. One physical design disadvantage noted is that the downward velocity component of the exiting wastewater into the bottom of the caisson may carry the oil droplets outside the lower end of the caisson before the separation of the oil from the water may be accomplished. Thus, oil droplets entrained in the water escape into the surrounding body of water before the droplets can rise to the surface. The location of the wastewater exit into the caisson at the lower end exacerbates this effect. This exit location allows interference with the oil and water separation by tidal and wave actions. Additionally, adding multiple appurtenances to the inside of the caisson increases the downward velocity, reduces retention time and provides areas for clogging and unnecessary shearing of oil particles.

Another disadvantage of current wastewater disposal systems is the use of sump tanks that are prone to fill up with solids. Many current designs use an overflow weir positioned at the top of the vapor/oil interface. The solids settle to the bottom of the sump tank. The accumulation of solids in the sump tank may result in severe oil removal problems that require the unit to be shut down for cleaning. Additionally, maintenance of fouled pipes or pump repairs may be required. Current designs may also have oil sumps prone to fill with water or "wash out" when precipitation rates are high. Oil discharged with the water exceeds the mandated discharge requirements and water discharged from the oil sump may be transported through recovered oil lines and contaminate recovered oil storage. Further treatment of the resulting mix of oil and water may then be required.

Another disadvantage is escaping hydrocarbon vapors from the treatment apparatus. Hydrocarbon volatilized from the separated oil above the vapor/oil interface inside the tank, caisson or pile may form potentially explosive mixtures inside the apparatus. Leaks of the mixture outside the apparatus may drift to potential spark or ignition sources found on or near the platform with disastrous results.

Other disadvantages of current treatment tanks, piles or caissons presently exist. These may include not being able to adjust overflow weirs or slots that skim the accumulated separated oil from the treated water. Additionally, inadequate protection from corrosive marine environments, problems with evacuating the accumulated oil from the oil sumps and nonexistent or inoperable sampling of the treated wastewater are noted in current designs.

Therefore, the art has sought a method and apparatus for treating rainwater and wash down water to more effectively separate oil and grease droplets from the wastewater before its discharge into the surrounding body of water and which reduce maintenance, process safety and environmental concerns.

SUMMARY OF THE INVENTION

In accordance with the invention, the foregoing advantages have been achieved through the present apparatus for wastewater treatment from a structure above a body of water. The apparatus includes: (a) a caisson, having an upper end and a lower end open to said body of water and adapted to extend from said platform to below said body of water thereby forming a vapor/oil interface and a water/oil interface; (b) an oil sump, carried by and within said caisson, having a bottom and a side wall extending above said vapor/oil interface; (c) an inlet pipe, carried by and within said caisson, having a lower end and an upper end and extending externally from said caisson for introducing wastewater below said water/oil interface; (d) an oil collection tube, carried by and within said caisson and having an upper end extending above said vapor/oil interface and an open lower end extending below said vapor/oil interface and through said side wall of said oil sump proximate said bottom, being adapted with at least one slotted opening for collecting oil proximate said vapor/oil interface and discharging such collected oil in said oil sump; and (e) an oil discharge tube, carried by and within said caisson and extending externally from said caisson for removing oil from said oil sump.

BRIEF DESCRIPTION OF THE DRAWINGS

For detailed understanding of the present invention, reference should be made to the following detailed description of the invention and preferred embodiments, taken in conjunction with the accompanying drawings, in which like elements have been given like numerals, and wherein:

FIGS. 6a and 6b-1 through 6b-4 are detailed schematic illustrations of an installation/removal/adjustment tool.

FIGS. 7a, 7b-1 and 7b-2 are detailed schematic illustrations of an oil collection tube using inner and outer sleeves.

FIG. 10-1 is an elevation schematic view of a rolling plate with a weep hole.

FIG. 10-2 is a top cross section schematic view of the rolling plate of FIG. 10-1.

Figure 1:
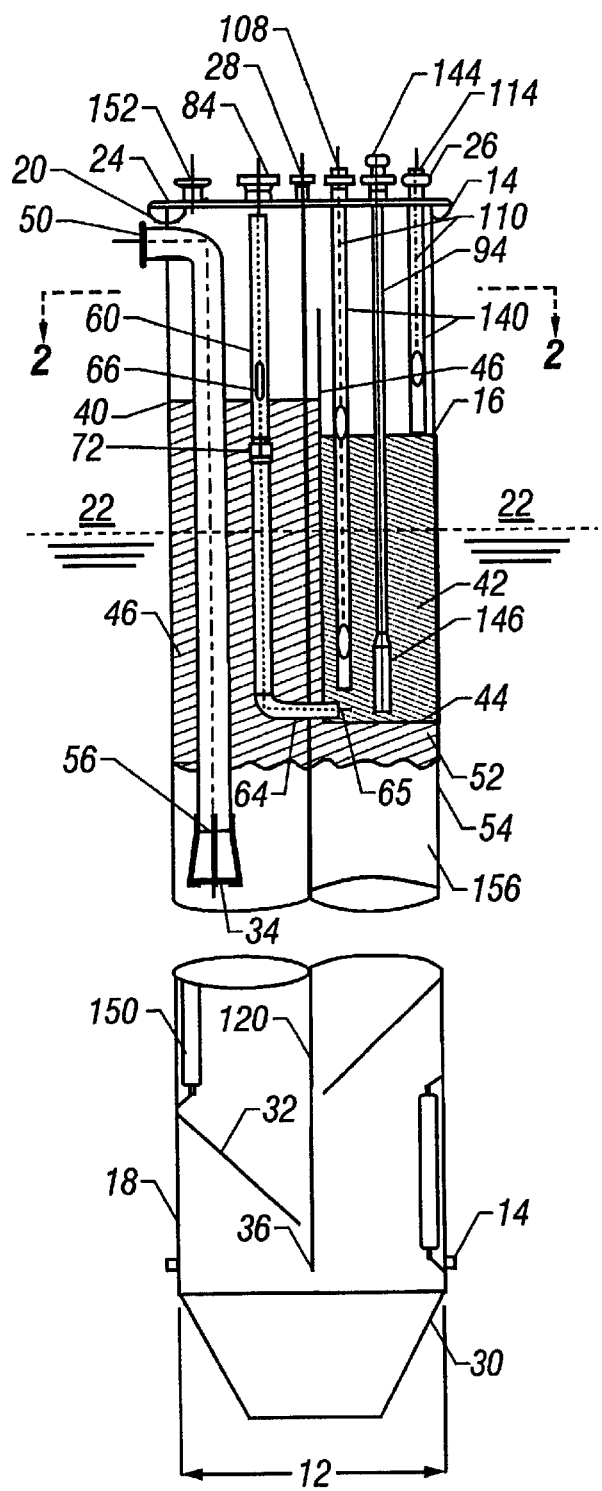
FIG. 1 is a side elevation sectional view of an embodiment of the wastewater treatment apparatus of the present invention.
Figure 2:
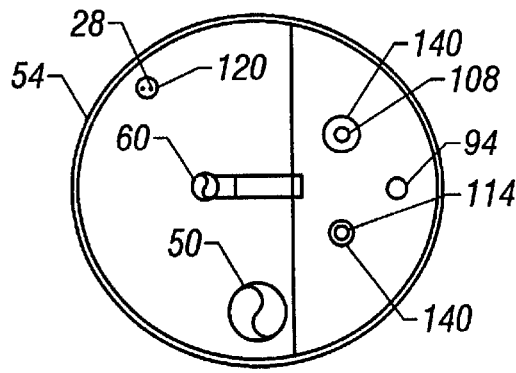
FIG. 2 is a cross section taken on the line above the vapor/oil interface of an embodiment of the wastewater treatment apparatus of the present invention.

While the invention will be described in connection with preferred embodiments, it will be understood that it is not intended to limit the invention to any preferred embodiment. On the contrary, it is intended to cover all alternatives, modifications, and equivalents, as may be included within the spirit and scope of the invention as defined by the appended claims.

DETAILED DESCRIPTION OF THE PREFERRED EMBODIMENTS

With reference to FIGS. 1–12, the wastewater treatment apparatus of the present invention will be described. The apparatus includes a wastewater collection chamber (caisson) 10 that may be made of a single large diameter 12 section of pipe or sections of pipe joined by welding, threaded connections, flanged connections or similar means known to those skilled in the art. Preferably, all pipe sections have lifting eyes 14 welded to the sections for positioning the section(s) or finally formed caisson 10 during construction and installation of the caisson 10. The lifting eyes 14 may also be used for removal of the caisson 10, if necessary. The caisson diameter 12 is sized using Stoke's Law based upon the specific gravity of the oil expected to be entrained, the particle size expected to be entrained by the rainwater or wash down water, the rate of expected rainfall in inches (or centimeters) per hour and the approximate surface area of the platform exposed to the rainfall. The particle size for a waste water crude generally used for design is from about 50 microns to about 1800 microns. The design rainfall rate may vary from about a 2-year rain to about a 100-year rain for the location of the platform.

The caisson 10 can be used for retention of produced water, the particle size generally used is suggested to be from about 20 microns to about 200 microns.

The caisson 10 has an upper end 16 extending from the structure (not shown) and a lower end 18 open to the surrounding body of water 22 which extends into the body of water 22. Preferably, the caisson 10 has a top flange 20 welded to the upper end 16. Optionally, a removable cover plate 24 may be secured to the top of flange 20 which preferably has a plurality of flanges 26 from which additional features, e.g. a sampler tube 28 may be mounted. The lower end of the caisson 18 open to the surrounding body of water 22 should be designed to extend below the mean sea level at the structure by the sum of the oil head, low tide level plus low wave trough. The caisson 10 preferably has a vent 152, by which vapor may be piped to a vapor recovery or disposal system such as a flare (not shown).

The caisson 10 preferably has a cone section 30 secured to the lower end of the caisson 18. The cone section 30 is also open to the surrounding body of water 22 but attenuates wave action inside the caisson 10 acting somewhat like a restriction orifice. Rolling plates 32 are optional, but if used, are preferably secured to the caisson 10, at intervals so as not to cause dead spaces of over five percent (5%) of the caisson. Rolling plates are located below the dispersal plate 34 and above the cone section 30. The rolling plates 32 also attenuate wave action inside the caisson 10. The rolling plates 32 also act as impingement devices to roll solids that might have absorbed or been coated with oil and entrained into the rainwater or wash down water. The rolling of the solids abrades oil from the solids and transfers oil to the rolling plates 32 before rain water or wash down water discharges through the lower end of the caisson 18. The rolling plates 32 are preferably perforated with weep holes 38 (See FIG. 10) to allow coalesced oil below any particular rolling plate 32 to float up the caisson 10 to the oil/water interface 52 rather than accumulating under the rolling plates 32. Weep holes 38, may be from about 2 inches to about 4 inches in radius.

As the oil coalesces and separates from the wastewater, the oil floats to the surface due to the difference in the specific gravity between the oil and the water. The location of the slots in the oil collection tube 60 above the surrounding body of water 22 determines the height of the vapor/oil interface 40 above mean sea level and the location of the oil/water interface 52 below the mean sea level. Specific gravity is a measure of relative density.

The higher the specific gravity of the oil, the more it will depress the oil/water interface 52 in the caisson. Conversely, the lower the specific gravity, the less the oil will depress the water and the higher the oil/water interface 52 will be. Still with reference to FIG. 1, an oil sump (or oil collection chamber) 42 preferably carried by and within the caisson 10 may have a bottom 44, which may be closed, and a side wall 46 extending above the vapor/oil interface 40.

An inlet pipe 50 for introducing wastewater below the oil/water interface 52 carried by and within the caisson 10, may extend externally from the side of the caisson 54. The inlet pipe 50 may alternatively extend through a flange on a removable cover plate 24. The inlet pipe outlet 56 is below the oil/water interface 52. Preferably, the inlet pipe outlet 56 extends below the oil/water interface 52 by an amount approximately equal to the design head of the oil based on the oil's specific gravity plus an adjustment based on expected low tides. This placement of the inlet pipe outlet 56 obviates potential discharge of the wastewater into the oil layer 48 where it could re-entrain the coalesced oil particles.

Figure 3:
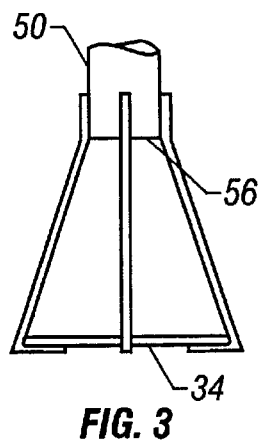
FIG. 3 is a schematic detailed illustration of the lower end of the wastewater inlet pipe and dispersal plate.
Figure 4:
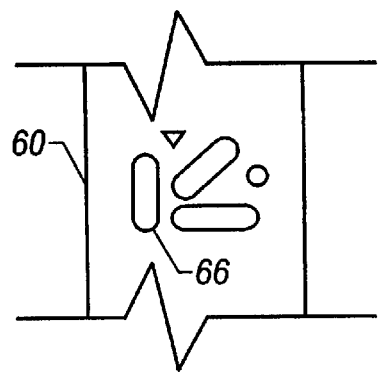
FIG. 4 is a schematic detailed illustration of certain examples of differently shaped slotted openings in the oil collection tube suitable for this invention.

With reference to FIGS. 1 and 3, a dispersal plate 34 is preferably secured proximate to the lower end of the inlet pipe outlet 56. The dispersal plate 34 is adapted to disperse the wastewater and convert the downward velocity component of the wastewater exiting the inlet pipe 50 to a horizontal velocity component. Reducing the downward velocity component of the wastewater reduces the probability of oil droplets escaping from the lower end of the caisson 18 before floating to the top of the oil/water interface 52, referring back to FIG. 1.

The oil collection tube 60 skims oil accumulated above the oil/water interface 52 and empties the oil into the oil sump 42. The oil collection tube 60 is carried by and within the caisson 10. The upper end 62 of the oil collection tube 60 extends above the vapor/oil interface 40. The lower end 64 of the oil collection tube 60 enters the oil sump 42 through the side wall 46 proximate the bottom 44 of the oil sump 42. The oil collection tube 60 is adapted with at least one opening 66 (preferably a slotted opening) for skimming oil. Preferably, the at least one slotted opening 66 is vertically adjustable. The configuration of any slotted opening 66 is not critical (See FIG. 4), but should be designed to further reduce the likelihood of plugging with solids. A strainer 58 (reference FIG. 7b-2) may be provided to catch and remove any solids that pass through the slots 66.

Figure 5:
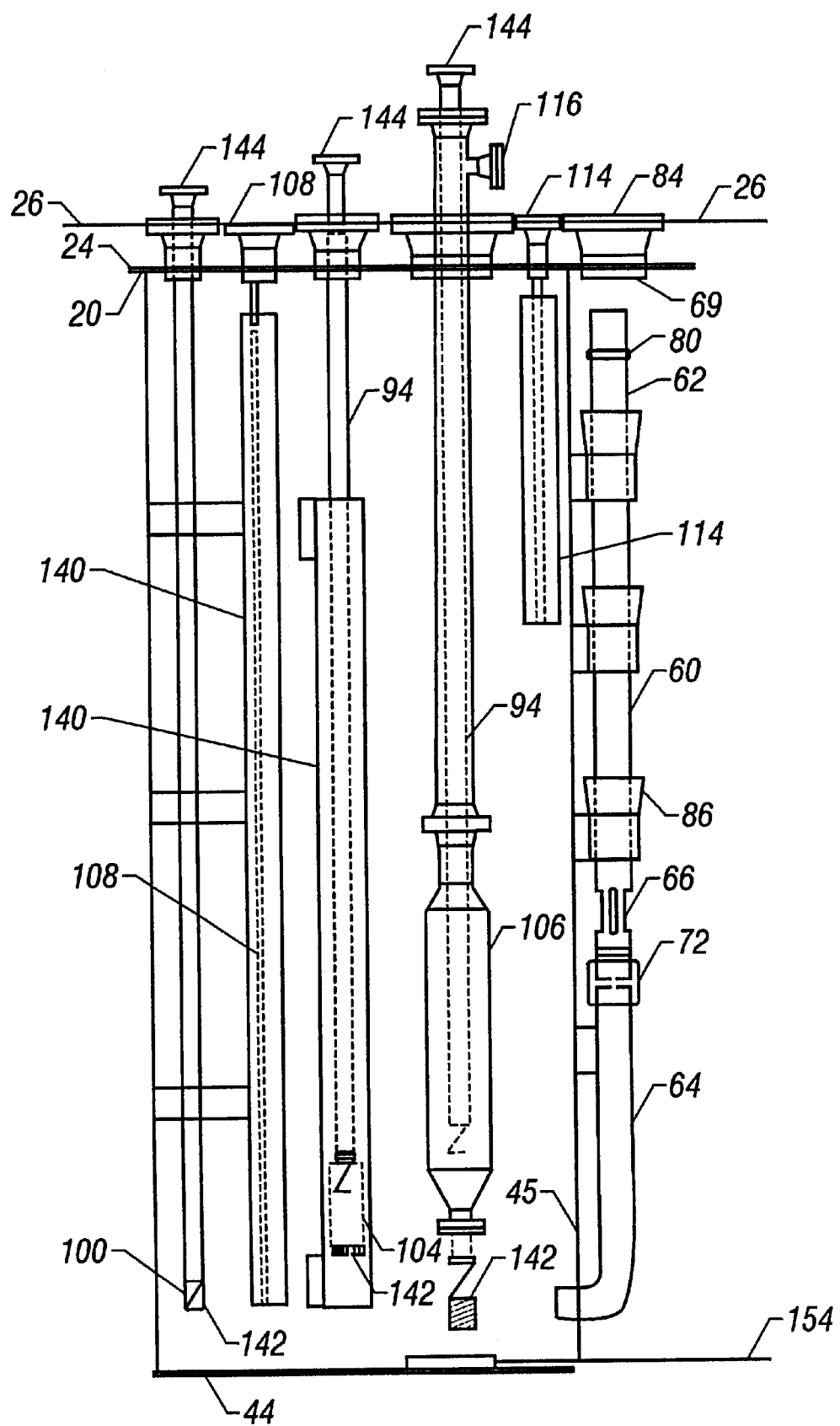
FIG. 5 is a detailed schematic illustration of an oil sump showing an oil collection and coupling tube using upper and lower sleeves.

With reference to FIG. 5, the oil collection tube 60 may comprise an upper end 62 and a lower end 64 connected with a coupling 72. The upper sleeve may be used to adjust the at least one slotted opening 66 by removing it from the caisson through the oil collection tube access 69 and adjusting the slotted opening 66. The adjustment allows the at least one slotted opening 66 to be raised or lowered to account for changes in the specific gravity of the oil or difference in the height of the structure above mean level. With reference to FIGS. 7a, 7b-1 and 7b-2, alternatively, the oil collection tube 60 may comprise an inner sleeve 76 and outer sleeve 78 adjustably connected throughout a bushing 74. The inner sleeve 76 diameter is sized to fit within the bushing 74 so that the inner sleeve 76 moves vertically within the outer sleeve 78.

Construction for the inner sleeve 76 is preferably from PVC pipe, more preferably schedule 80 minimum PVC pipe and the outer sleeve from carbon steel. The coupling 72 is preferably made of stainless steel, more preferably 316 stainless steel. The bushing 74 is preferably made of stainless steel. With reference to FIG. 5 and FIGS. 7a and 7b (b1–b2), guides 86 are provided to hold the oil collection tube 60 in place, and to guide it back into coupling 72 if it is removed from the caisson.

Figure 12:
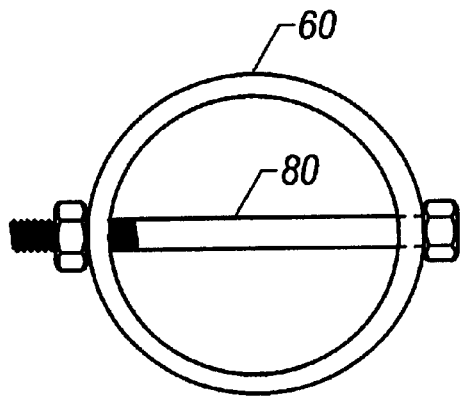
FIG. 12 is a detailed schematic illustration of the fitting at the top of the oil collection tube.

Referring generally to FIGS. 7a and 7b, the oil collection tube 60 may extend proximate to the cover plate 24. With reference to FIG. 12, this embodiment may have a fitting 80 at the upper end of the oil collection tube 60 to enable adjustment of the slotted opening 66 positioned from the structure. With reference to FIGS. 6a and 6b-1 through 6b4, an adjustment tool 82 may be provided for insertion into the fitting 80 for the adjustment. A hatch 84 (FIG. 7a) may be provided in the removable cover plate 24 (FIG. 7a) for insertion of the adjustment tool 82 into the fitting 80. The adjustment tool 82 may comprise a handle 88 and shaft 90 connected to a fork end 92 distally from the handle 88. Referring to FIGS. 5 and 6A the adjustment tool 82 may be adapted for insertion into the fitting 80 at the upper end 62 of the oil collection tube 60. The length of the tool 82 being determined by the distance from the oil collection tube 60 and fitting 80 from the cover plate 24. Thus, at least one slotted opening 66 may be vertically adjusted.

Figure 8A:
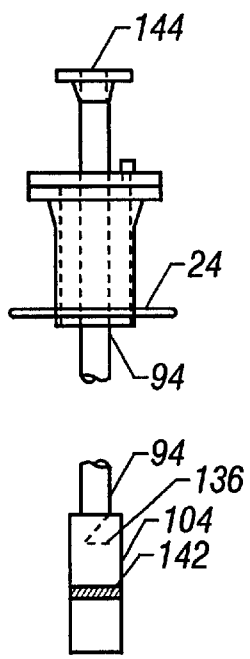
FIG. 8a is a detailed schematic illustration of an oil discharge tube with a submersible sump pump configuration.
Figure 8B:
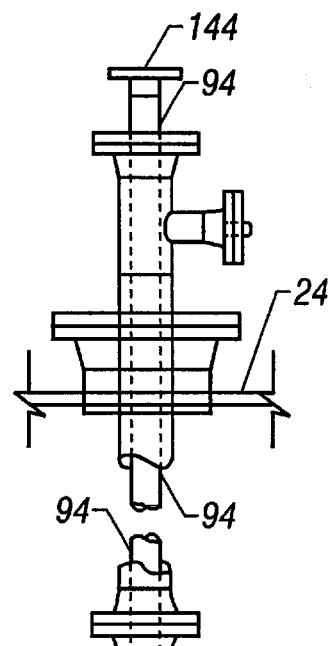
FIG. 8b is a detailed schematic illustration of an oil discharge tube with a blowcase configuration.
Figure 8C:
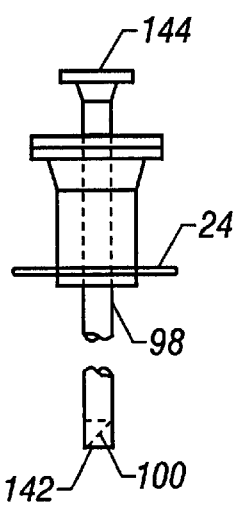
FIG. 8c is a detailed schematic illustration of an oil discharge tube with an external pump configuration and associated piping.

Again with reference to FIG. 1, an oil discharge tube 94, carried by and within the caisson 10, may extend externally from the side of the caisson 54 for removing oil from the oil sump 42. Alternatively, the oil discharge tube 94 may be flanged to a removable cover plate 24 located on the upper end of the caisson 16 or optionally, the oil discharge tube 94 may extend through one of a plurality of flanges 26 located on the removable cover plate 24. With reference to FIG. 8c, an external pump (not shown) located on the caisson or structure may have a suction line 98 with a distal end of the suction line located within the oil sump 42 (FIG. 1). A foot valve 100 may be attached at the distal end of the suction line to prevent oil from flowing back into the oil sump 42.

Suitable foot valves for the present invention include poppet disc and hinged disc foot valves. The external pump, preferably a double diaphragm pump, is used to remove the oil from the oil sump 42 and pump it to recovered oil storage (not shown). With reference to FIG. 8a, in one preferred embodiment uses a submersible sump pump 104 carried at the distal end of oil discharge tube 94 to remove the oil from the oil sump 42 (FIG. 1) and pump it to recovered oil storage. With reference to FIG. 8b, in another preferred embodiment the oil discharge tube 94 may terminate in a blowcase 106 in the oil sump 42. A check valve 136 may be attached at the distal end of the oil discharge tube 94 and a foot valve 100 at the distal end 136 of the blowcase 106.

Figure 9:
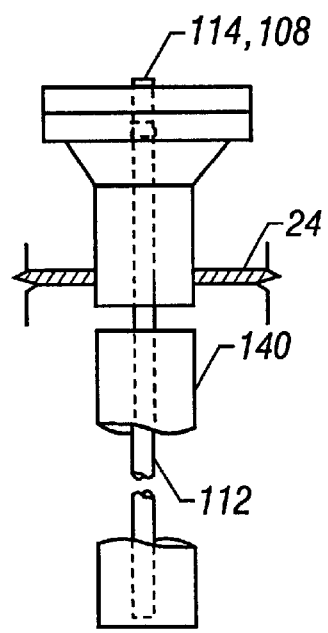
FIG. 9 is a detailed schematic illustration of a level control system configuration using a bubbler tube.
Figures 2, 10:
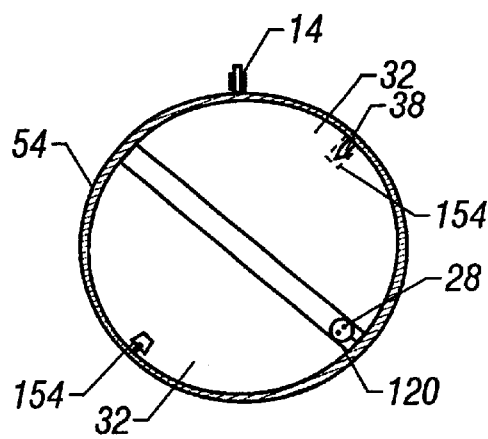
Figures 1, 10:
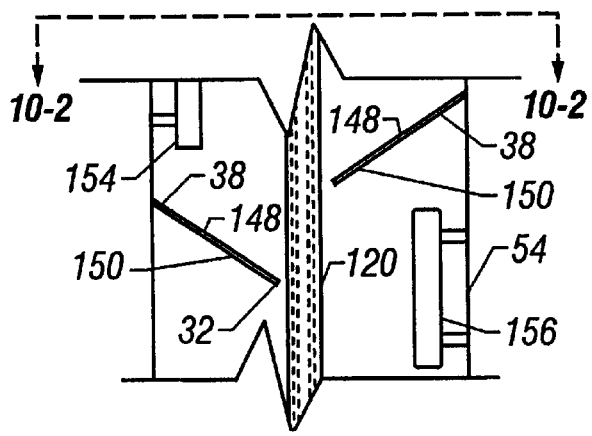

A level control system 108 (reference FIG. 1) may be provided to control the removal of the recovered oil from the oil sump 42. The level control system 108 preferably has at least one sensor 110 located within a stilling column 140 within the recovered oil in the oil sump 42. The type of sensor is not critical. Level sensing devices such as floats or displacers may be used. Pressure sensors calibrated to measure the level of the recovered oil may also be used. With reference to FIG. 9, in one preferred embodiment, a bubbler tube 112 may be used. The level control system 108 may use level switches or a continuous level measurement signal as input signals to the control system. The type of overall control system used for level control is not critical and may be selected from many conventional control systems using electronic or pneumatic signals, including simple local level controllers, discrete controllers, distributed control systems or complex advanced computer control systems and combinations thereof Still referring to FIG. 9, in one preferred embodiment, an upper level signal may initiate the removal of the recovered oil from the oil sump 42. For example, when the level of the recovered oil rises and activates the upper level signal, a pump (not shown) may be started to begin removing the recovered oil. Optionally, the upper level signal could open a gas supply 116 to a blowcase 106 to begin the removal of the recovered oil. As the recovered oil level falls, a lower level signal may be activated to stop the oil removal by turning the pump or gas supply 116 off. The level signals used may be actual physical switching devices, bubbler tubes or may be software switches provided in electronic based control systems known in the art. In another preferred embodiment, the level may be controlled at a relatively constant value.

A high level control system 114 of the same configuration as the control system 108, except only a high level signal is required, sends an alarm to the control panel if the oil level in the oil sump 42 should rise beyond the normal height that would be obtained if the level switches and oil discharge systems were working properly.

Figure 11B:
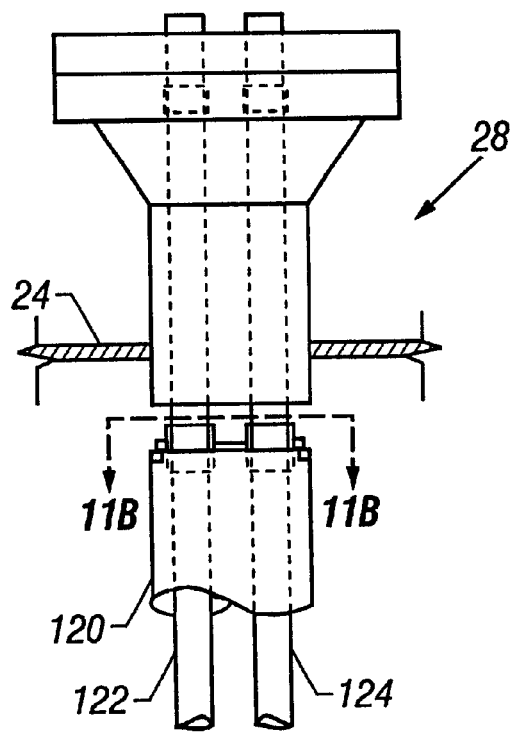
FIG. 11 is a detailed schematic illustration of a sampler tube.
Figure 11B:
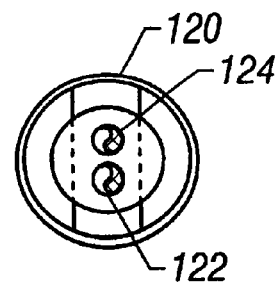
Figure 11A:
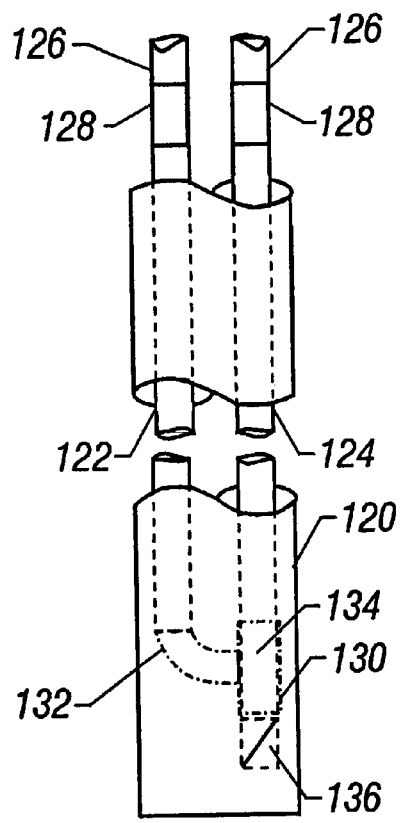

Referring generally to FIG. 1, one preferred embodiment of the present invention provides a sampling feature. A sampler tube 28 may be added and carried within the caisson 10. Referring to FIG. 11, the sampler tube 28 may comprise a protector pipe 120 having an inlet sample pipe 122 and an outlet sample 124 pipe carried within the protector pipe 120. In one embodiment, the sampler tube 28, preferably including a protector pipe 120, inlet sample pipe 122 and outlet sample pipe 124, comprises a plurality of tube sections 126 connected with unions 128. Preferably, the unions 128 are from about 5 ft to about 20 ft apart. The unions 128 allow the sampler tube 28 to be lifted from the caisson and dismantled in sections, thereby allowing for low overhead clearance on the structure.

With reference to FIG. 11, in one preferred embodiment, the sampler tube 28 uses a tee 130, having a flow through run 132 and a flow through branch 134. In this particular embodiment the inlet sample pipe 122 is connected to the outlet sample pipe 124 using the flow through run 132. Also, in this particular embodiment, a check valve 136 is preferably connected to the lower end of the flow through branch 134 of the tee 130. The flow through branch 134 of the tee 130 and connected check valve 136 are preferably positioned within the protector pipe 120 near its centerline and proximate the lower end of the caisson 18. In this position, the cone section 30 dampens wave effects that could potentially dilute the sample of the treated wastewater with water from the surrounding body of water 22. This location also provides mechanical protection of the sampler tube 28.

A sample may be taken by introducing vapor into the inlet sample pipe 122. In a preferred embodiment gas may be used. As the vapor passes by the tee 130, the pressure in the line is increased and closes the check valve 136 and treated wastewater exits the outlet sample pipe 124. Suitable check valves useful in this invention include lift check valves, swing check valves and tilting disc check valves.

Again with reference to FIG. 1, another preferred embodiment of the present invention may comprise (a) a caisson 10, having a top flange 20 welded to the upper end of the caisson 16 and a lower end of the caisson 18 open to the surrounding body of water 22 and adapted to extend from above said structure into the surrounding body of water 22 thereby forming a vapor/oil interface 40 and a water/oil interface 52; (b) a removable cover plate 24 secured to said top flange 20 of said caisson 10, said removable cover plate 24 having a plurality of flanges 26; (c) an oil sump 42 welded to and within said caisson 10, having a closed bottom 44 and a side wall 46 extending above said vapor/oil interface 40; (d) an inlet pipe 50, carried by and within said caisson 10 and extending externally from said caisson 10 for introducing wastewater below said water/oil interface 52 through an inlet pipe outlet 56; (e) a dispersal plate 34 secured proximate to the inlet pipe outlet 56 adapted to disperse said wastewater (whereby a downward velocity component of said wastewater is converted to a horizontal velocity component; (f) an oil collection tube 60, carried by and within said caisson 10 and having an upper end 62 extending above said vapor/oil interface 40 and a lower end 64 extending below said vapor/oil interface 40 and through said side wall 46 of said oil sump 42 proximate to said closed bottom 44, being adapted with at least one slotted opening 66 for collecting oil proximate said vapor/oil interface 40 and discharging such collected oil in said oil sump 42 through an opening 65; (g) a level control system 108 carried within said caisson 10 having at least one sensor 110 inside said oil sump 42; (h) a level alarm system 114 having at least one sensor 110 inside said oil sump; (i) an oil discharge tube 94, carried by and within said caisson 10 having an exit 144 and an entrance 142 wherein said exit 144 extends externally said upper end of said caisson 16 and wherein said entrance 142 (FIG. 5) extends proximate said bottom 44 of said oil sump 42; (j) a discharge mechanism 146, said discharge mechanism 146 being located at distal end of said oil discharge tube 94 proximate said entrance 142; (k) a sampler tube 28 carried within said caisson 10; (l) at least one rolling plate 32 having an upper surface 148 and a lower surface 150 (See FIG. 10) and forming an acute angle from about 30 degrees to about 45 degrees between said lower surface 150 of said rolling plate 32 and said caisson 10; (m) a vent 152 (FIG. 1), adapted to remove accumulated vapor from above said vapor/oil interface 40; and (n) at least one anode 154 (FIG. 10) adapted to retard corrosion.

In accordance with another aspect of the present invention, the foregoing advantages may be achieved by the present method for treating wastewater containing oil from a structure above a body of water. Referring generally to FIG. 1, this aspect of the present invention may include the steps of supplying a caisson 10, having an upper end 16 and a lower end 18 open to said body of water 22 and adapted to extend from said structure into said body of water 22; introducing wastewater through an inlet pipe 50 carried by and within said caisson 10; separating oil from the wastewater within the caisson 10 to produce an oil layer 48, an vapor/oil interface 40, and oil/water interface 52 and a water layer 156; skimming oil from the oil layer 48 into an oil sump 42 to produce a recovered oil using an oil collection tube 60 carried by and within said caisson 10, and having an upper end extending above said vapor/oil interface 40, through at least one slotted opening 66 proximate said vapor/oil interface 40; removing the recovered oil from the oil sump 42 to a location external from said caisson 10. In a preferred method, the wastewater is introduced through the inlet pipe 50 below the oil/water interface 52. More preferably, the wastewater is introduced below the oil/water interface 52 at a point approximately equal to the design head of the oil based upon the oil's specific gravity plus an adjustment based upon expected low tides.

Another feature of the present invention is adding a step of dispersing the wastewater using a dispersal plate 34 following the wastewater's introduction. The dispersing step converts the downward velocity component of the wastewater exiting the inlet pipe outlet 56 to a horizontal velocity component. Reducing the downward velocity component of the wastewater reduces the probability of oil escaping from the lower end of the caisson 18 before floating to the top of the oil/water interface 52.

A further feature of the inventive method is the step of vertically adjusting the at least one slotted opening 66. Another feature of this aspect of the present invention is that the at least one slotted opening 66 may be vertically adjusted from the structure using an adjustment tool 82. The convenience of being able to vertically adjust at lease one slotted opening 66 from the structure facilities, due to changes resultant from a change in the specific gravity of the oil, may increase process safety on the platform as the inlet tube does not require withdrawal to adjust or cutting new slots.

Referring back to FIG. 5, an additional feature of the present invention may include a step of removing recovered oil from the oil sump 42 using a submersible sump pump 104 carried at the distal end of said oil discharge tube 94; a blowcase 106 carried at the distal end of said oil discharge tube 94; or an external pump (not shown), preferably a double diaphragm pump.

The present invention may include the step of removing recovered oil from the oil sump 42 using a level control system 108. The level control system 108 may include at least one sensor 110 located within the oil sump 42. Preferably, the sensor is a bubbler tube 112. The present invention may also include the step of signaling a high level oil alarm in the oil sump 42 using a high level control system 114.

Referring to FIGS. 1 and 11 an additional feature of the present invention is the step of sampling the water layer 156. Preferably, a sample of water from the lower end of the caisson 18 is discharged by a vapor flowing through an inlet sample pipe 122 through a tee 130 into an outlet sample pipe 124. The sample may then be collected from the outlet sample pipe 124.

A further feature of the present invention is the step of dampening wave action within said caisson 10. Wave and tidal actions may be dampened by adding a restriction at the open end of the caisson 10 such as a cone section 30.

In accordance with another aspect of the present invention, the step of rolling wastewater entrained solids on rolling plates 32 to remove absorbed oil or oil coatings on the solids may be used to reduce any oil discharged into the surrounding body of water 22. The additional step of providing weep holes 38 in the rolling plates 32 may further enhance the amount of oil recovered from the caisson 10 by allowing coalesced oil to float up the caisson 10 to the oil/water interface 52 rather than accumulating under the rolling plate 32.

It is to be understood that the apparatus and method of the present invention is not to be limited to the exact details of construction, operation, exact materials or embodiments shown and described as obvious modifications and equivalents will be apparent to one skilled in the art, for example, a flat section with an opening to the surrounding body of water 22 could be used to dampen wave effects at the lower end of the caisson 18 rather than a cone section 30. Accordingly, the invention is therefore to be limited only by the scope of the appended claims.

What is claimed is:

1. A method of treating wastewater containing oil from a structure above a body of water, comprising:
   (a) supplying a caisson, having an upper end and a lower end open to said body of water and adapted to extend from said structure into said body of water;
   (b) introducing wastewater through an inlet pipe carried by and within said caisson;
   (c) separating oil from wastewater within said caisson to produce an oil layer, a vapor/oil interface, oil/water interface and a water layer;
   (d) skimming oil from said oil layer into an oil sump to produce a recovered oil using an oil collection tube, carried by and within said caisson and having an upper end extending above said vapor/oil interface, through at least one slotted opening proximate said vapor/oil interface;
   (e) removing said recovered oil from said oil sump to a location external from said caisson.

2. The method of claim 1 further comprising dispersing said wastewater using a dispersal plate.

3. The method of claim 1 further comprising vertically adjusting said at least one slotted opening.

4. The method of claim 1 further comprising using an adjustment tool for vertically adjusting said at least one slotted opening from said platform.

5. The method of claim 1 wherein removing recovered oil from said oil sump uses a submersible sump pump carried within said oil sump.

6. The method of claim 1 wherein removing recovered oil from said oil sump uses a blowcase carried within said oil sump.

7. The method of claim 1 wherein removing recovered oil from said oil sump uses an external double diaphragm pump.

8. The method of claim 1 wherein removing recovered oil from said oil sump uses a level control system.

9. The method of claim 8 wherein said level control system comprises a bubbler tube.

10. The method of claim 1 further comprising sampling said water layer.

11. The method of claim 10 wherein sampling further comprises discharging sampled water from an outlet sample pipe.

12. The method of claim 1 further comprising dampening wave action within said caisson.

13. The method of claim 1 further comprising rolling solids entrained in said wastewater.

14. An apparatus for wastewater treatment from a structure above a body of water comprising:
   (a) a caisson, having an upper end and a lower end open to said body of water and adapted to extend from said structure into said body of water, said body of water thereby forming a vapor/oil interface and a water/oil interface within said caisson;
   (b) an oil sump, carried by and within said caisson, having a bottom and a side wall extending above said vapor/oil interface;
   (c) an inlet pipe, carried by and within said, caisson having a lower end and an upper end and extending externally from said caisson for introducing wastewater below said water/oil interface;
   (d) an oil collection tube, carried by and within said caisson and having an upper end extending above said vapor/oil interface and a lower end extending below said vapor/oil interface and through said side wall of said oil sump proximate said bottom, being adapted with at least one slotted opening for collecting oil proximate said vapor/oil interface and discharging such collected oil in said oil sump, wherein said at least one slotted opening is vertically adjustable; and
   (e) an oil discharge tube, carried by and within said caisson and extending externally from said caisson for removing oil from said oil sump.

15. The apparatus of claim 14, further comprising a dispersal plate secured proximate to said lower end of said inlet pipe.

16. The apparatus of claim 14, wherein said oil collection tube further comprises an upper sleeve and a lower sleeve connected with a coupling.

17. The apparatus of claim 14, further comprising a submersible sump pump carried at distal end of said oil discharge tube.

18. The apparatus of claim 14, further comprising a blowcase carried at distal end of said oil discharge tube.

19. The apparatus of claim 14 further comprising a pump located external to said oil sump and having a suction line with a distal end and a foot valve attached at said distal end.

20. The apparatus of claim 19 wherein said external pump is a double diaphragm pump.

21. The apparatus of claim 14 further comprising a level control system carried within said oil sump.

22. The apparatus of claim 21 wherein said level control system comprises a bubbler tube.

23. The apparatus of claim 14 further comprising a sampler tube carried within said caisson.

24. The apparatus of claim 23 wherein said sampler tube comprises a plurality of tube sections connected with unions.

25. The apparatus of claim 14 further comprising a cone section secured to said lower end of said caisson.

26. The apparatus of claim 14 further comprising at least one rolling plate secured to said caisson.

27. The apparatus of claim 14 wherein said caisson is formed by at least one section further having at least two lifting eyes adapted for positioning said caisson.

28. The apparatus of claim 14 wherein said caisson is formed by at least two welded sections having at least two lifting eyes adapted for positioning said caisson.

29. An apparatus for wastewater treatment from a structure above a body of water comprising:
   (a) a caisson, having an upper end and a lower end open to said body of water and adapted to extend from said structure into said body of water, said body of water thereby forming a vapor/oil interface and a water/oil interface within said caisson;

(b) an oil sump, carried by and within said caisson, having a bottom and a side wall extending above said vapor/oil interface;

(c) an inlet pipe, carried by and within said, caisson having a lower end and an upper end and extending externally from said caisson for introducing wastewater below said water/oil interface;

(d) an oil collection tube, carried by and within said caisson and having an upper end extending above said vapor/oil interface and a lower end extending below said vapor/oil interface and through said side wall of said oil sump proximate said bottom, being adapted with at least one slotted opening for collecting oil proximate said vapor/oil interface and discharging such collected oil in said oil sump, wherein said oil collection tube comprises an upper sleeve and a lower sleeve connected with a coupling and an adjustment tool for vertically adjusting said at least one slotted opening in said oil collection tube by rotating said upper sleeve connected with said coupling from said structure; and (e) an oil discharge tube, carried by and within said caisson and extending externally from said caisson for removing oil from said oil sump.

30. An apparatus for wastewater treatment from a structure above a body of water comprising:

(a) a caisson, having an upper end and a lower end open to said body of water and adapted to extend from said structure into said body of water, said body of water thereby forming a vapor/oil interface and a water/oil interface within said caisson;

(b) an oil sump, carried by and within said caisson, having a bottom and a side wall extending above said vapor/oil interface;

(c) an inlet pipe, carried by and within said, caisson having a lower end and an upper end and extending externally from said caisson for introducing wastewater below said water/oil interface;

(d) an oil collection tube, carried by and within said caisson and having an upper end extending above said vapor/oil interface and a lower end extending below said vapor/oil interface and through said side wall of said oil sump proximate said bottom, being adapted with at least one slotted opening for collecting oil proximate said vapor/oil interface and discharging such collected oil in said oil sump, wherein said oil collection tube further comprises an inner sleeve and an outer sleeve adjustably connected with a bushing; and (e) an oil discharge tube, carried by and within said caisson and extending externally from said caisson for removing oil from said oil sump.

31. An apparatus for wastewater treatment from a structure above a body of water comprising:

(a) a caisson, having an upper end and a lower end open to said body of water and adapted to extend from said structure into said body of water, said body of water thereby forming a vapor/oil interface and a water/oil interface within said caisson;

(b) a sampler tube carried within said caisson;

(c) an oil sump, carried by and within said caisson, having a bottom and a side wall extending above said vapor/oil interface;

(d) an inlet pipe, carried by and within said, caisson having a lower end and an upper end and extending externally from said caisson for introducing wastewater below said water/oil interface;

(e) an oil collection tube, carried by and within said caisson and having an upper end extending above said vapor/oil interface and a lower end extending below said vapor/oil interface and through said side wall of said oil sump proximate said bottom, being adapted with at least one slotted opening for collecting oil proximate said vapor/oil interface and discharging such collected oil in said oil sump; and (f) an oil discharge tube, carried by and within said caisson and extending externally from said caisson for removing oil from said oil sump, wherein said sampler tube comprises a protector pipe having an inlet sample pipe and an outlet sample pipe carried within said protector pipe, a tee having a flow through run and a flow through branch wherein said tee connects said inlet sample pipe and said outlet sample pipe using said flow through run and a check valve carried by said flow through branch of said tee.

32. An apparatus for wastewater treatment from a structure above a body of water, comprising:

(a) a caisson, having a top flange welded to an upper end and a lower end open to said body of water and adapted to extend from above said structure into said body of water thereby forming a vapor/oil interface and a water/oil interface;

(b) a removable cover plate secured to said top flange of said caisson, said removable cover plate having a plurality of flanges;

(c) an oil sump attached to and within said caisson, having a closed bottom and a side wall extending above said vapor/oil interface;

(d) an inlet pipe, carried by and within said caisson having an inlet extending externally from said caisson for introducing wastewater below said water/oil interface through an outlet;

(e) a dispersal plate secured proximate to said outlet of said inlet pipe adapted to disperse said wastewater whereby a downward velocity component of said wastewater is converted to a horizontal velocity component;

(f) an oil collection tube, carried by and within said caisson and having an upper end extending above said vapor/oil interface and a lower end extending below said vapor/oil interface and through said side wall of said oil sump proximate said closed bottom, said oil collection tube being adapted with at least one slotted opening for collecting oil proximate said vapor/oil interface and discharging such collected oil in said oil sump;

(g) a level control system carried within said caisson having at least one sensor inside said oil sump;

(h) an oil discharge tube, carried by and within said caisson having an upper end and a lower end wherein said upper end extends externally said upper end of said caisson and wherein said lower end extends proximate said bottom of said oil sump;

(i) a discharge mechanism, said discharge mechanism being at least partially contained within said oil sump proximate said lower end;

(j) a sampler tube carried within said caisson;

(k) at least one rolling plate having an upper surface and a lower surface and forming an acute angle between said lower surface of said rolling plate and said caisson;

(l) a vent, adapted to remove accumulated vapor from above said vapor/oil interface; and (m) at least one anode adapted to retard corrosion.

33. An apparatus for treating waste fluid containing oil and water recovered from a structure above a body of water, comprising:

(a) a waste fluid collection chamber having an upper end above said body of water and a lower end extending into said body of water, said waste fluid collection chamber receiving said waste water and causing said oil in said waste water to float over said body of water, within said waste fluid collection chamber;

(b) an oil collection chamber for receiving oil from said waste fluid collection chamber, said oil collection chamber having a wall for separating the received oil from said waste fluid collection chamber; and (c) a fluid transfer device having at least one slotted opening in said waste fluid collection chamber transferring oil above a predetermined level from said waste fluid collection chamber to said oil collection chamber, said at least one slotted opening being vertically adjustable above said body of water to adjust said predetermined level.

34. The apparatus of claim 33 further comprising a device for discharging said oil from said oil collection chamber.

35. The apparatus of claim 33 further comprising an inlet fluid line for supplying said waste fluid from said structure into said waste fluid collection chamber.

36. The apparatus of claim 35 wherein said inlet fluid line discharges said waste fluid into said body of water within said waste fluid collection chamber.

37. The apparatus of claim 36 wherein said inlet fluid line includes a dispersal plate that disperses said waste fluid into said body of water within said waste fluid collection chamber.

* * * * *